US011333159B2

(12) United States Patent
Kobielski et al.

(10) Patent No.: US 11,333,159 B2
(45) Date of Patent: May 17, 2022

(54) TURBOCHARGER DEVICE

(71) Applicant: GE Global Sourcing LLC, Norwalk, CT (US)

(72) Inventors: Louis Kobielski, Sherman, NY (US); Baris Uygun, Erie, PA (US); Adam C. Felton, Grove City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 158 days.

(21) Appl. No.: 16/397,193

(22) Filed: Apr. 29, 2019

(65) Prior Publication Data

US 2020/0340488 A1 Oct. 29, 2020

(51) Int. Cl.
*F02C 6/12* (2006.01)
*F04D 29/059* (2006.01)
*F02B 33/40* (2006.01)

(52) U.S. Cl.
CPC ............ *F04D 29/059* (2013.01); *F02B 33/40* (2013.01); *F05B 2240/54* (2013.01)

(58) Field of Classification Search
CPC .... F04D 29/5893; F04D 29/059; F04D 25/04; F02B 37/00; F02B 37/39; F02B 37/40; F02C 6/12; F05B 2240/54
See application file for complete search history.

(56) References Cited

U.S. PATENT DOCUMENTS 8,453,717 B1 * 6/2013 Roper ..................... F28F 21/06 165/80.4
9,464,639 B2 * 10/2016 Yang ................... F04D 29/4206
2014/0369811 A1 * 12/2014 Malins .................. F01D 25/186 415/111
2020/0018270 A1 * 1/2020 Friske ..................... B22F 10/20

* cited by examiner

*Primary Examiner* — David E Sosnowski
*Assistant Examiner* — Maxime M Adjagbe
(74) *Attorney, Agent, or Firm* — Philip S. Hof

(57) ABSTRACT

A turbocharger device includes a case having a turbine portion and a bearing portion connected to and extending from the turbine portion. The turbine portion defines a cavity that houses a turbine wheel and receives exhaust gas that rotates the turbine wheel. The bearing portion houses a shaft connected to the turbine wheel. The bearing portion has a radial thickness between an exterior surface and an interior surface. The interior surface defines a central channel. The bearing portion holds a bearing system that supports the shaft within the central channel. The bearing portion includes a lattice structure within the radial thickness. The lattice structure is a repeating three-dimensional array of frame segments connected to one another at junctions. The lattice structure engages a turbine back wall that is located between the turbine portion and the bearing portion. The lattice structure defines interstitial spaces between the frame segments.

20 Claims, 3 Drawing Sheets

TURBOCHARGER DEVICE

FIELD

Embodiments of the disclosure relate to turbocharger devices.

BACKGROUND

Turbochargers are used to increase the efficiency and power output of an internal combustion engine by forcing compressed air into the combustion chamber. Turbochargers are typically powered by a turbine wheel driven by exhaust gases of the internal combustion engine, thereby recycling energy. The turbochargers have a turbine end and a compressor end. The turbine end houses the turbine wheel and receives the hot exhaust gas from the engine. The compressor side houses a compressor wheel that is connected to the turbine wheel via a shaft that extends through an intermediate bearing section of the turbocharger between the turbine and compressor ends. Exhaust-driven rotation of the turbine wheel rotates the compressor wheel through the shaft. Air introduced into the compressor end is compressed by the rotation of the compressor wheel, and the compressed air is forced into the combustion chamber.

The high temperature of the exhaust gases introduced into the turbine end has been known to cause or exacerbate damage within conventional turbochargers, especially if the heat transfers across the turbocharger towards the compressor end. For example, because the turbine end has a much greater temperature than the compressor end (which is not exposed to exhaust gases), the presence of thermal gradients may cause thermal fatigue on the housings or cases that hold the rotating components. The thermal fatigue may reduce the operational lifetime of the housings, such as by increasing the likelihood of spalling, cracks, and the like. Furthermore, if sufficient heat from the exhaust gas transfers into the intermediate bearing section, the heat may damage seals which may cause an oil leak, increasing wear on the rotating and stationary components.

Furthermore, to increase efficiency of internal combustion engines in vehicles, for example, it may be desirable for turbochargers to operate at higher loads. The turbine ends of the turbochargers may be exposed to even greater temperatures at such higher loads. It may be desirable to have a turbocharger that differs from those that are currently available.

BRIEF DESCRIPTION

In one or more embodiments, a turbocharger device is provided that includes a case having a turbine portion and a bearing portion. The turbine portion defines a cavity that houses a turbine wheel. The cavity receives exhaust gas that rotates the turbine wheel. The bearing portion is connected to and extends from the turbine portion. The bearing portion houses a shaft connected to the turbine wheel. The bearing portion has a radial thickness between an exterior surface of the bearing portion and an interior surface of the bearing portion. The interior surface defines a central channel that is fluidly connected to the cavity of the turbine portion. The bearing portion holds a bearing system that supports the shaft within the central channel. The bearing portion includes a lattice structure within the radial thickness. The lattice structure is a repeating three-dimensional array of frame segments connected to one another at junctions. The lattice structure engages a turbine back wall that is located between the cavity of the turbine portion and the central channel of the bearing portion. The lattice structure defines interstitial spaces between the frame segments.

In one or more embodiments, a turbocharger device is provided that includes a case having a radial thickness between an exterior surface of the case and an interior surface of the case. The interior surface defines a central channel. The case defines a bearing portion of the case. The bearing portion holds a bearing system that supports a shaft disposed within the central channel. The shaft is connected to a turbine wheel. The bearing portion of the case includes a lattice structure within the radial thickness of the case. The lattice structure is a repeating three-dimensional array of frame segments connected to one another at junctions. The lattice structure engages a turbine back wall that is located between the turbine wheel and the bearing portion of the case. The lattice structure defines interstitial spaces between the frame segments.

In one or more embodiments, a turbocharger device is provided that includes a case defining a bearing portion. The bearing portion has a radial thickness between an exterior surface of the bearing portion and an interior surface of the bearing portion. The interior surface defines a central channel. The bearing portion holds a bearing system that supports a shaft disposed within the central channel. The shaft is connected to a turbine wheel. The bearing portion includes a lattice structure within the radial thickness. The lattice structure is a repeating three-dimensional array of frame segments connected to one another at junctions of the lattice structure. The junctions define internal pockets therein. The junctions are arranged in multiple planes spaced apart along a length of the bearing portion. The lattice structure defines interstitial spaces between the frame segments. The junctions in a first plane engage a turbine back wall located between the turbine wheel and the central channel of the bearing portion. The internal pockets of the junctions in the first plane and the interstitial spaces between the frame segments connected to the junctions in the first plane interface with the turbine back wall to limit a surface area of the lattice structure in physical engagement with the turbine back wall.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
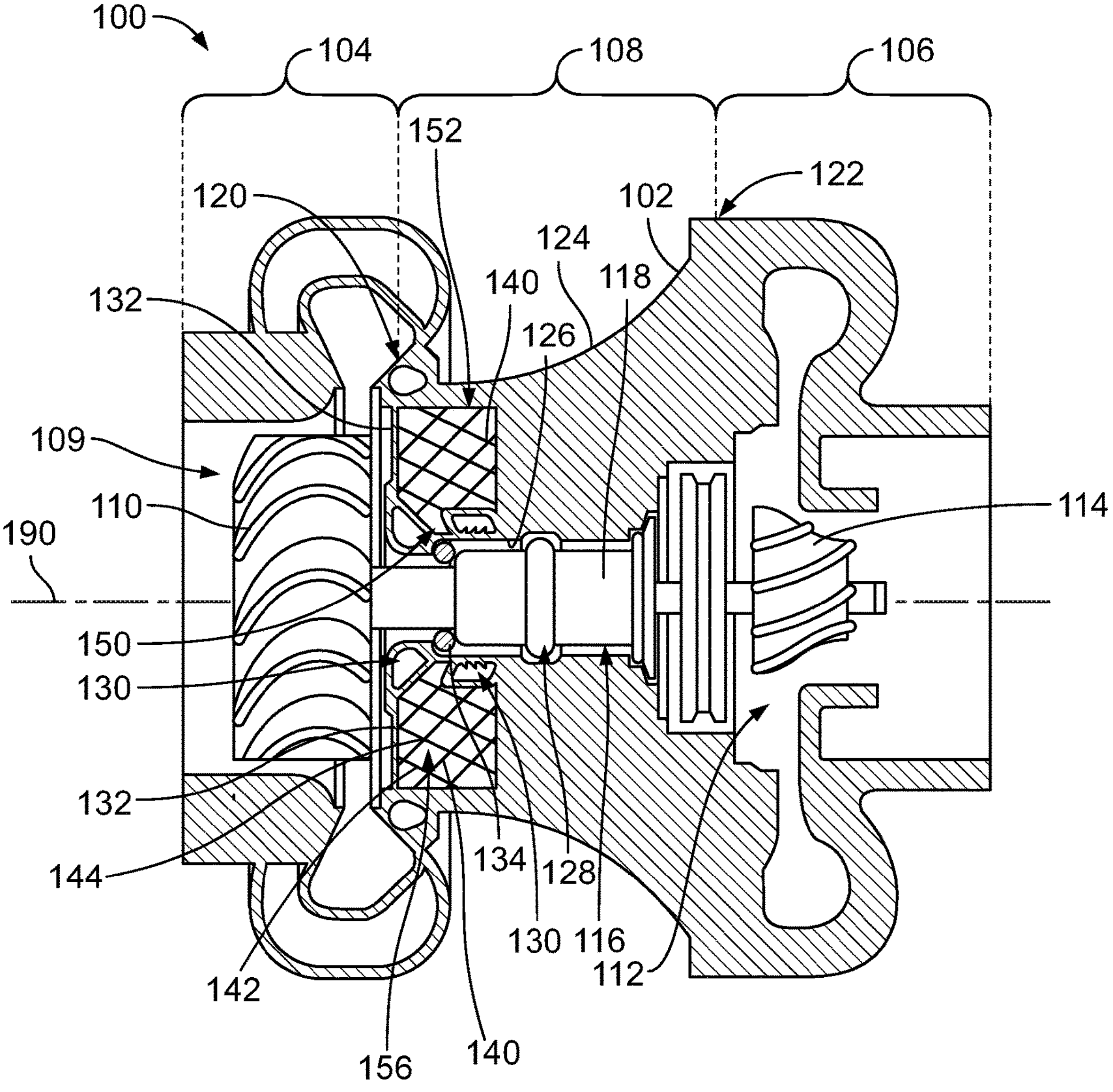
FIG. 1 is a cross-sectional view of a turbocharger device according to an embodiment.

One or more embodiments of the inventive subject matter described herein relates to turbochargers or turbocharger devices. Examples of turbochargers include turbine-driven forced induction devices that have an exhaust gas side and an intake air side (compressor), and a bearing portion in that houses one or more bearings. The inventive turbocharger devices described herein may have a monolithic case, rather than an assembly of multiple discrete cases bolted together at interfaces according to conventional turbochargers. Even with seals at the interfaces between adjacent cases, the interfaces of conventional turbochargers provide potential leak paths and/or failure points. The monolithic structure according to at least one embodiment described herein may avoid the potential leak paths and/or failure points because the structure lacks such interfaces. In addition to one embodiment being a seamless construction, the wall of the bearing portion may define a lattice structure within a radial thickness of the bearing portion.

A suitable lattice structure may be a repeating three-dimensional array or web of frame segments connected to one another at junctions. The lattice structure defines interstitial spaces between the frame segments. The lattice structure may provide mechanical strength, rigidity, vibration dampening and/or transmission, sound deadening, crushability or other mechanical parameters for maintaining a structural integrity of the bearing portion. The lattice structure may affect (and therefor allow control over) other, non-mechanical parameters, such as thermal conduction through the bearing portion, vibration transfer, cooling flow paths through the bearing portion, and the like. While the lattice structure may provide rigidity along one axis, it may be at least somewhat relatively compliant along another axis.

In one embodiment, the lattice structure may reduce the amount of heat transfer from the exhaust end of the turbocharger into the intermediate bearing section by increasing the thermal resistance. The thermal resistance may be increased by reducing the extent of thermal conduction and/or reducing the thermal conductivity of the material. Compared to known turbochargers that have solid bearing portions, the lattice structure within the thickness of the bearing portion described herein may reduce thermal conduction due to the interstitial spaces between the frame segments, and reduce thermal conductivity due to the interstitial spaces being filed by one or more gases that have a lower thermal conductivity (e.g., higher thermal resistivity) than the material of the bearing portion. The lattice structure may effectively function as a thermal heat shield integrated within the bearing portion. The thermal shield may desirably reduce the likelihood of heat-related issues, such as oil leaks, thermal fatigue, and the like. Reduced thermal fatigue, for example, may extend an operational lifetime of the rotating device.

Although various embodiments described herein incorporate the lattice structure into a turbocharger device, the lattice structure may be installed in other devices. For example, the lattice structure may be employed for the purpose of providing thermal insulation to block or reduce heat transfer along the path defined by the lattice. Some suitable applications for the lattice structure may include integration within a heat sink, within the walls of a combustion chamber, within the walls of an insulated container, and/or the like. Generated thermal energy may then preferentially flow in directions other than where the lattice structure has been deployed. By controlling aspects of the lattice structure, such as the configuration, size, periodicity, segment thickness, material composition, interstitial fill, and the like, the thermal transfer characteristics can be determined and tailored for application specific parameters.

FIG. 1 is a cross-sectional view of a rotating device, and specifically in this example is a turbocharger device 100 according to an embodiment. The turbocharger device shown (also referred to herein as the turbocharger) is a rotary assembly that includes rotating components within a stationary case 102. The turbocharger may be used in one or more applications. Suitable applications may include mobile applications, such as automotive, marine, rail, aerospace, and the like. Other suitable applications may be stationary, such as in a stationary power generator.

The case defines a turbine portion 104, a compressor portion 106, and a bearing portion 108 that represent different sub-sections of the case. The bearing portion may be disposed between the turbine portion and the compressor portion. A first end 120 of the bearing portion may be connected to the turbine portion. The bearing portion extends from the turbine portion to the compressor portion. A second end 122 of the bearing portion, which may be opposite the first end, may be connected to the compressor portion.

In an embodiment, the bearing portion may be integrally connected with the turbine portion and/or the compressor portion such that the case defines a monolithic (e.g., unitary, one-piece) structure. Thus, the bearing portion may seamlessly extend from the turbine portion and/or the compressor portion, which eliminates any potential leak paths or structural weak points at the interface(s) between the corresponding portions. For example, the bearing portion may be formed during a common formation process with the turbine portion and/or the compressor portion. In the illustrated embodiment, the bearing portion is seamlessly connected to both the turbine portion and the compressor portion such that the entire case is monolithic. The common formation process may be an additive manufacturing process. Forming the case as a monolithic structure may reduce cost and/or improve manufacturing efficiency over known turbochargers with separate and discrete cases. For example, forming a unitary case may reduce the number of assembly steps by avoiding the installation of fasteners to mechanically couple the discrete portions to one another, and the installation of seals at the seams or interfaces. The unitary case also eliminates potential leak paths between the different portions of the case, and may provide increased component strength and uniformity by eliminating structural weak points at seams between the different portions. In an alternative embodiment, the bearing portion of the case may be discrete from the turbine portion and the compressor portion, and the case may be assembled by mechanically coupling the three cases together via clamps, bolts, or other fasteners.

The turbine portion defines a cavity 109, and a turbine wheel 110 may be housed within the cavity. The cavity receives exhaust gas from an internal combustion engine via an inlet or port (not labeled). The exhaust gas drives rotation of the turbine wheel relative to the turbine portion. The compressor portion similarly defines a compressor cavity 112 that houses a compressor wheel 114. The bearing portion defines a central channel 116 that houses a shaft 118. The central channel may be fluidly connected to the cavity of the turbine portion at the first end of the bearing portion and may be fluidly connected to the cavity of the compressor portion at a second end 122. The shaft may be mechanically connected to both the turbine wheel and the compressor wheel. Exhaust-driven rotation of the turbine wheel causes the shaft and the compressor wheel to rotate due to the mechanical connection. The rotation of the compressor wheel compresses air that may be received into the compressor portion. At least a portion of the compressed air may be directed to the engine. The engine may operate more efficiently and/or provide increased power output due to the receipt of the compressed air from the turbocharger, relative to receiving non-compressed ambient air. The turbocharger may extract energy from the exhaust gas for forced air induction into the engine prior to dispelling the exhaust gas into the ambient environment.

The bearing portion of the case may have a radial thickness (unlabeled) that extends between an exterior surface 124 of the bearing portion and an interior surface 126 of the bearing portion. The interior surface defines at least a portion of the central channel that houses the shaft. The bearing portion may hold and support a bearing system 128 within the central channel. The bearing system supports the shaft and allows the shaft to rotate within low friction. The bearing system includes one or more bearings. Suitable bearings may include races, and one or more of radial sleeve bearings (to enable rotation of the shaft), thrust bearings (to retain the shaft in a fixed axial position), and/or the like. Lubricant may be supplied into the central channel and/or directly onto the bearings. The lubricant may reduce friction between the rotating shaft and the stationary bearing portion and may provide some thermal management. A suitable lubricant is oil. The bearing portion may define a flow circuit (unlabeled) that guides the lubricant through the thickness of the bearing portion from an oil source that may be outside of the bearing portion. The bearing portion may define one or more cooling channels 130 within the thickness of the bearing portion. The cooling channels in the illustrated embodiment may be disposed radially, and located proximate to the interior surface, and disposed axially, and located proximate to the first end. The bearing portion may be composed of a metal or a metal alloy. For example, the bearing portion may include iron, nickel, cobalt, and/or chromium.

The turbocharger may include a turbine back wall 132 that may be disposed at an interface (unlabeled) between the cavity of the turbine portion and the central channel of the bearing portion. The turbine back wall may be solid. The turbine back wall may be exposed to exhaust gases within and passing through the cavity. The turbine back wall may be a component of the turbine portion, a component of the bearing portion, or a discrete part that may be separate from both portions of the case. The turbine back wall blocks the exhaust gases from penetrating through the turbine back wall into the bearing portion. Although the turbine back wall may not prevent the flow of gases and/or liquids from the cavity of the turbine portion into the central channel of the bearing portion, the turbocharger includes one or more seals 134 to seal the central channel along the radial gap between the outer perimeter of the shaft and the interior surface. The seals may be disposed adjacent to the interior surface of the bearing portion and/or to the shaft.

The bearing portion of the case may include a lattice structure 140 within the radial thickness of the bearing portion. In one embodiment, the lattice structure may be a repeating three-dimensional array or web. The lattice structure may include multiple repeating frame segments 142 connected to one another at junctions 144. The lattice structure may be located at or proximate to the first end of the bearing portion. The lattice structure may reduce heat transfer from the hot exhaust gases within the cavity of the turbine portion into the bearing portion (and the central channel thereof). The lattice structure may transfer head differently relative to other configurations. The heat transfer rate may be lower in the illustrated embodiment relative to known turbochargers that are solid throughout the radial thickness of their bearing portion. The lattice structure may provide better thermal insulation (e.g., greater resistance to thermal energy transfer) than the solid wall.

The lattice structure may have a length along a longitudinal axis 190 of the turbocharger, a width extending between the interior surface and the exterior surface in the illustrated cross-section, and a depth extending into and out of the page in the illustrated cross-section. Thus, although the cross-section depicts a single slice of the turbocharger, the lattice structure may extend within the thickness of the bearing portion along an entire circumference of the bearing portion. In the illustrated embodiment, the lattice structure engages (e.g., in physical contact) the turbine back wall. Thus, the length of the lattice structure extends from the turbine back wall towards the compressor portion. In the illustrated embodiment, the length of the lattice structure along the longitudinal axis may be at least one-fourth of the length of the bearing portion. In other embodiments, the length of the lattice structure may be one-third, one-half, or more of the length of the bearing portion. In another embodiment, the length of the lattice structure may be less than one-fourth of the bearing portion. The length and width of the lattice structure, as well as the thickness of the walls themselves, and the size of the repeating units, and the sizes of the aspects of the repeating units, may be selected with reference to application specific factors.

The width or radial width of the lattice structure may be defined between an inner end 150 of the lattice structure and an outer end 152 of the lattice structure. The inner end may be proximate to (e.g., within a designated threshold distance of) the interior surface of the bearing portion. For example, the inner end may be within 2 mm or 4 mm of the interior surface. The outer end 152 of the lattice structure may be radially located between the inner end and the exterior surface of the bearing portion. The outer end may be proximate to (e.g., within a designated threshold distance of) the exterior surface, such as within 2 mm or 4 mm of the exterior surface. The outer end of the lattice structure defines an outer diameter of the lattice structure. In one or more embodiments, the outer diameter of the lattice structure may be equal to or greater than a diameter (e.g., an outer diameter) of the turbine wheel. The outer diameter of the lattice structure may be equal to or greater than a diameter of the cavity of the turbine portion that houses the turbine wheel. Sizing the lattice structure to have a large radial diameter relative to the turbine wheel and/or cavity enables the lattice structure to provide significant thermal shielding to prohibit heat transfer from the hot exhaust gases in the turbine portion into the bearing portion and the components therein. For example, if the outer diameter of the lattice structure may be much smaller than the turbine wheel and/or the cavity, then heat may be permitted to conduct from the cavity into the bearing portion around the outside of the lattice structure, reducing the effectiveness of the lattice structure.

In an embodiment, the lattice structure may be fully enclosed within the radial thickness of the bearing portion. For example, the lattice structure may have a closed perimeter. The lattice structure may be closed off to the cavity of the turbine portion by the turbine back wall. The lattice structure may be closed off to the central channel of the bearing portion by a portion of the bearing portion between the interior surface of the bearing portion and the inner end of the lattice structure. The lattice structure may be closed off to the outside environment by a portion of the bearing portion between the exterior surface of the bearing portion and the outer end of the lattice structure.

The lattice structure defines interior spaces, referred to herein as interstitial spaces 156, between the frame segments. The interstitial spaces may be filled with one or more gases, such as air, nitrogen, oxygen, carbon dioxide, or the like. The gas may be trapped within the lattice structure due to the closed perimeter. The trapped gas increases the thermal insulation properties of the lattice structure because gases may be less thermally conductive than solids and liquids. Thus, the gas within the interstitial spaces of the lattice structure acts as a thermal insulation material that reduces heat transfer from the turbine portion through the lattice structure into the bearing portion. In an alternative embodiment, the perimeter of the lattice structure may not be fully closed. For example, the bearing portion may define ports between the lattice structure and the exterior surface of the case to enable ambient air from the outside environment to flow into and out of the lattice structure.

The bearing portion and/or other portions of the case may be formed via additive manufacturing. Additively manufacturing the bearing portion allows for the bearing portion to be more compact and include fewer separate and distinct components, to have more complex three-dimensional shapes, and/or to have varying materials and compositions than non-additively manufactured bearing portions. Additive manufacturing can involve joining and solidifying material under computer control to create a three-dimensional object, such as by aggregating liquid molecules or fusing powder grains with each other. Examples of suitable additive manufacturing methods may include powder bed laser fusion, electron beam fusion, binder jet, or the like, selected based at least in part on the application parameters. For example, binder jet additive manufacturing may utilize a glue to adhere fine powder particles, followed by a sintering stage to fuse the particles. In at least one embodiment, the lattice structure within the radial thickness of the bearing portion may be formed during a common additive manufacturing process within the remainder of the bearing portion. Thus, a first subset of layers formed during the additive manufacturing process may represent a solid portion of the bearing portion between the lattice structure and the second end of the bearing portion. Once the process proceeds to the desired location of the lattice structure, the computer-controlled manufacturing device may begin to form the frame segments of the lattice structure in layers. Optionally, the frame segments of the lattice structure may be composed of the same materials as the solid portions of the bearing portion remote from the lattice structure. Alternatively, the additive manufacturing device may switch materials to utilize a different type of material to form the lattice structure than the material used to form the solid portions of the case.

Optionally, the turbine back wall may also be formed during the common additive manufacturing process. For example, immediately before or after forming the layers that represent the lattice structure, the additive manufacturing device may form the turbine back wall and other parts of the turbine portion of the case. By forming the turbine portion during a common process with the bearing portion, the lattice structure may be integrally (e.g., seamlessly) connected to the turbine back wall. The common additive manufacturing process may enable the lattice structure to be integrated within the radial thickness of the bearing portion in-situ as the bearing portion is formed, without requiring an additional step to insert or join the lattice structure to the bearing portion.

In an alternative embodiment, the bearing portion can be formed in a manner other than by additive manufacturing, such as via die casting or another type of molding process. The die cast bearing portion may define an opening within the radial thickness that accommodates installation of a discrete, pre-formed lattice structure therein.

Figure 2:
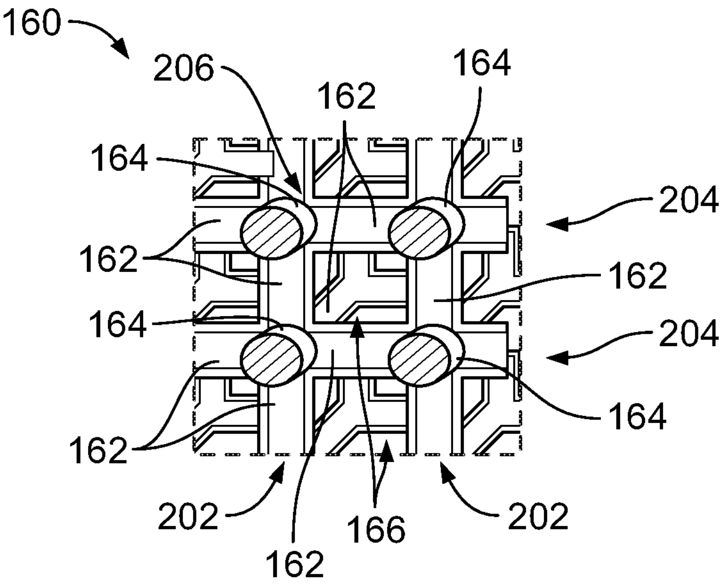
FIG. 2 is a perspective view of a portion of a lattice structure of a bearing portion of the turbocharger device according to an embodiment.

FIG. 2 is a perspective view of a portion of a lattice structure 160 of the bearing case according to one embodiment. The lattice structure includes frame segments 162 connected to one another at junctions 164 or nodes. The frame segments may be struts, beams, plates, or the like. Interstitial spaces 156 may be defined between the frame segments. The lattice structure may have a three-dimensional shape extending in a longitudinal direction, a lateral direction, and a depth direction. The junctions may be regularly arranged in space. Multiple frame segments may extend from each node in various different directions. The junctions may be arranged in multiple rows 202 and multiple columns 204. The columns may be transverse to the rows. FIG. 2 shows two rows and two columns of the lattice structure. The interstitial spaces may be defined between the frame segments in adjacent rows and between the frame segments in adjacent columns. The illustrated rows and columns extend in the depth direction to define planes.

The lattice structure may include repeating unit cells 206 defined by the junctions and the frame segments. The unit cells may have a parallelepiped shape. The junctions define corners of the unit cells, and the frame segments may define sides of the unit cells. In the illustrated embodiment, the unit cells may be primitive such that the junctions may be present only at the corners of the unit cells. Alternatively, the unit cells may be centered instead of primitive, such that some of the junctions may be located at positions other than at the corners.

In FIG. 2, the frame segments may be linear and may be elongated in different orthogonal directions. The frame segments optionally have uniform lengths. The frame segments may have curved outer surfaces. For example, the frame segments may have oval cross-sections, circular cross-sections, or rectangular cross-sections with curved corners. The unit cells may have repeating shapes, such as diamond shapes, vaulted or arched shapes, polygonal shapes (e.g., triangular, quadrilateral (e.g., cubic), pentagonal, hexagonal, etc.), or the like.

In the illustrated embodiment, the unit cells have quadrilateral shapes with six faces. Each junction connects six frame segments. The unit cell may be cubic. The quadrilateral unit cell shape may repeat along the volume of the lattice structure. Each of the six faces of the unit cell may define an opening that represents an interstitial space. Furthermore, the interior of the cubic unit cell may be open (e.g., hollow) to fluidly connect the interstitial spaces. The interstitial spaces through the faces of the unit cells and within the interiors of the unit cells may be filled by one or more gases that provide thermal insulation, as described above with reference to FIG. 1.

Optionally, the dimensions of the lattice structure may vary in at least one direction through the case. For example, the frame segments may have varying lengths, such that some segments are longer than other segments. The unit cells may vary in size along the longitudinal axis of the case. For example, the unit cells proximate to the turbine back wall are smaller and occupy less interior space than the unit cells farther from the turbine back wall. The unit cells may be smaller in areas that require greater structural support, and larger in areas that require less structural support.

The lattice structure shown in FIG. 2 may be formed via an additive manufacturing process. For example, the lattice structure may be built by positioning the bearing portion of the case on a build platform angled at 45 degrees from horizontal, such that the unit cells are formed as diamond-shaped cells. For example, the individual frame segments may be formed on the bearing portion by depositing material layer-by-layer along slopes that are oblique to the horizontal and vertical directions.

The frame segments may have other shapes in other embodiments. For example, the frame segments may be curved instead of linear. The unit cells 206 may have other than four junctions and other than six faces. In another non-limiting example, the unit cells may have repeating vault shapes. The vault shape may be defined at least partially by a pair of arched frame segments that curve towards one another and connect at an apex (e.g., a junction). The vault unit cell may have the style of a continuous barrel vault, which may be generally semicircular in shape with a continuous arch, the style of a pointed barrel vault, which may have a pointed junction between two arched segments, or a combination of both styles (e.g., a first area of the lattice has the continuous barrel vault style and a second area has the pointed barrel vault). Other examples of vault-shaped unit cells may include rib vaults, which have intersecting arches of different diameters, and fan vaults, which have arched frame segments that may be centered and radially fan outward. The vaulted unit cells in the lattice structure may provide significant structural support for the bearing portion along at least one direction while utilizing a limited number of frame segments (thereby limiting the number of conductive thermal pathways through the lattice structure).

The lattice structure may be a three-dimensional fractal structure with interconnected elongated members and nodes arranged in a regular, repeating pattern. Properties and characteristics of the lattice structure may be selected based on application-specific parameters and desired functionality. For example, properties such as the shape of individual (and repeated) cells within the structure can be selected to provide stronger structures, more conductive structures, structures having greater surface areas, etc. The number of elongated (or frame) members connected with each other at each node can be selected to obtain desired structural strength, conductivity, heat dissipation, surfaces area, size, etc. Optionally, the angles or slopes of elongated members extending from the junctions, the thickness, length, or cross-sectional shape of the elongated members, the distance between nodes, the size, thickness, or cross-sectional shape of the nodes, the density, relative density, porosity, or the like, can be selected to obtain a desired strength, conductivity, surface area, density, heat dissipation ability, etc. The properties may be uniform throughout the lattice structure or, alternatively, may vary such that one or more properties in one area of the lattice structure differs from one or more properties in another area of the lattice structure. The relative density represents the density of the material divided by the density of the lattice structure. The porosity represents a measurement of the amount of void material (e.g., air) occupying the volume.

According to one or more embodiments, the cell shape may be arched, vaulted, polygonal (e.g., triangular, quadrilateral, pentagonal, hexagonal, etc.), diamond, star, or the like. The frame members may be beams (e.g., struts), plates, or the like. The frame members may be linear, may be curved, or both such that some of the frame members have linear segments and curved segments. Optionally, some of the frame members may be linear and other frame members may be curved. The lengths of the frame members may be on the order of micrometers or millimeters, such as between 100 micrometers and 10 millimeters. The thicknesses or diameters of the frame members may be less than the lengths. The characteristics of the lattice structure may be selected to control specific parameters, such as stiffness, compression resistance, shear force resistance, tension resistance, thermal conduction, electrical conduction, elasticity, porosity, and the like.

The lattice structure may be formed of one or more materials. The one or more materials may include plastic, ceramic, and/or metal. The plastic material may include or represent an epoxy resin, a vinyl ester, a polyester thermosetting polymer (e.g., polyethylene terephthalate (PET)), polypropylene, or the like. The ceramic material may include or represent silica, alumina, silicon nitride, or the like. The metal material may include or represent aluminum alloys, titanium alloys, cobalt chrome alloys, stainless steel, nickel alloys, or the like. The lattice structure may be a composite including a mixture of multiple materials, such as a plastic with a ceramic, a ceramic with a metal (known as a cermet composite material), and/or a plastic with a metal. Optionally, the lattice structure may represent a reinforced composite, such as a fiber-reinforced plastic. The fiber-reinforced plastic may include embedded fibers within a matrix layer of the plastic. The fibers may be carbon fibers, glass fibers, aramid fibers (e.g., Kevlar®), basalt fibers, naturally-occurring biological fibers such as bamboo, and/or the like. The reinforced composite may be reinforced with other shapes of material other than fibers, such as a powder or strips in other embodiments. The reinforcements may be embedded within any of the plastics listed above. The cermet composite material may be composed of any of the ceramics and the metals listed above.

As described herein, the lattice structure may be formed from an additive manufacturing process, in which the structure is constructed layer by layer. Suitable processes include, for example, powder bed laser fusion, electron beam fusion, and binder jetting. Powder bed laser fusion involves depositing a layer of powder on a build plate and fusing selective portions of the power using a ytterbium fiber laser that scans a CAD pattern. Binder jetting creates a part by intercalating metal powder and polymer binding agent that bind the particles and layers together without the use of laser heating. The material of the lattice structure may be selected based at least in part on the proposed method of additive manufacturing. For example, the binder jet materials that include the binder and the metal (or ceramic, or cermet) may make the green form (e.g., the shape prior to sintering). The green form might be in the final shape or may be shaped so that the sintered form is the final shape. Optionally, the binder may fill the interstitial spaces within the lattice.

The lattice structure described herein can provide several technical effects. For example, the lattice structure may provide weight-savings while retaining structural integrity, thereby providing a greater strength-to-weight ratio. The weight is reduced by the presence of interstitial spaces or voids throughout the structure. Reducing the amount of matter within the lattice structure may provide manufacturing cost savings due to conservation of material, particularly if the lattice structure material is relatively expensive (e.g., such as titanium).

The lattice structure can also provide enhanced thermal transfer properties and/or better control of heat transfer. For example, the lattice structure has a large surface area per volume or form factor, attributable to the multitude of frame segments. The large surface area allows for heat transfer to the lattice structure or from the lattice structure, depending on a thermal gradient. The interstitial spaces within the lattice structure may define inherent flow paths for materials, such as air, water, a refrigerant, or the like, to flow through the lattice structure to dissipate heat. The inherent flow paths may reduce or eliminate the number of cooling flow paths that are drilled or otherwise formed to provide desired coolant flow properties. The lattice structure may also be used to control the path of heat transfer. For example, the lattice structure may function as an integrated thermal shield to restrict thermal conduction in a path extending through the lattice structure. For example, air or other gases within the lattice structure may at least partially restrict the transfer of heat from the solid material across the lattice structure. The use of the lattice structure as an inherent thermal shield may obviate a cost of assembling a discrete, external thermal shield on the turbocharger device.

Furthermore, the lattice structure described herein defines a multitude of parallel paths for thermal conduction, electrical conduction, and/or mechanical strength, and this redundancy may have several advantages. For example, the lattice structure may be utilized to provide shock absorption and impact protection, vibration absorption, and noise dampening. The lattice structure may reduce vibration transmission between the turbine portion and the bearing portion of the case. Upon receiving an impact force, some of the frame members and/or nodes may bend and/or deflect to absorb the energy. Furthermore, even if one or more of the paths are damaged by an impact force, excessive thermal or electrical energy, or the like, the redundant nature of the lattice structure ensures that non-damaged portions remain functionable. Thus, damage to a portion of the lattice structure may not be catastrophic to the functionality of the lattice.

Figure 3:
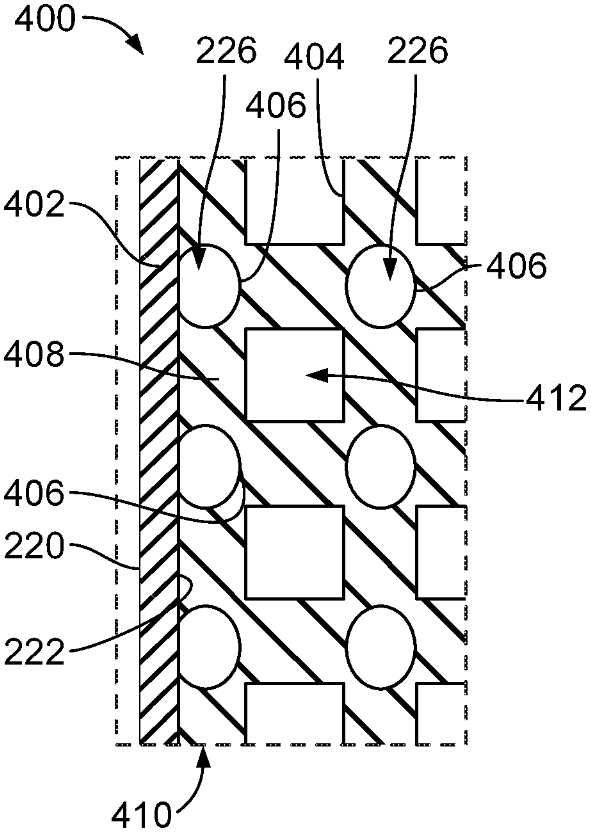
FIG. 3 is a cross-sectional view of a portion of the turbocharger device showing a turbine back wall and the lattice structure according to an embodiment.

FIG. 3 may be a cross-sectional view of a portion of a turbocharger 400 showing a turbine back wall 402 and a lattice structure 404 according to an embodiment. The cross-section may be taken along a first plane that intersects junctions 406 of the lattice structure. The turbine back wall may have a first side 220 that faces the turbine wheel (shown in FIG. 1) and a second side 222 opposite the first side. The lattice structure engages (in physical contact) the second side of the turbine back wall. For example, the junctions and frame segments 408 in a first plane or row 410 of the lattice structure interface with (e.g., align with, extend from, physically contact, or the like) the second side of the turbine back wall.

In the illustrated embodiment, the frame segments may be solid. The solid frame segments may provide strength and rigidity for structurally supporting the bearing portion of the case. The frame segments that may be colinear with the first plane physically contact the second side of the turbine back wall. The junctions may define internal pockets 226 therein. The internal pockets may be voids or hollows within the junctions. The internal pockets may be closed off and segregated from interstitial spaces 412 defined between the frame segments. The internal pockets may be filled with one or more gases. The internal pockets reduce the amount of solid matter of the bearing portion that engages the turbine back wall, thereby reducing thermal conduction from the turbine back wall into the bearing portion. For example, the areas of the turbine back wall that align with the internal pockets in the first plane may be not in physical contact with the solid material of the lattice structure. Therefore, heat may be not able to be conducted into the bearing portion along those areas.

The internal pockets and/or the voids between the frame segments may be filled with a filler material that is selected based on application specific parameters. The filler material differs from the lattice structure material that forms the frame segments and the junctions (or nodes). As described above, the filler material may be a gas, such as air or a gas having a lower thermal conductivity than air. In an alternative embodiment, the lattice structure could be filled with a liquid polymer that flows into the lattice structure and optionally may undergo a phase change to harden into a solid. Optionally, the liquid polymer may remain a liquid instead of solidifying. In another example, the lattice structure could be filled with a solid powder.

Figure 4:
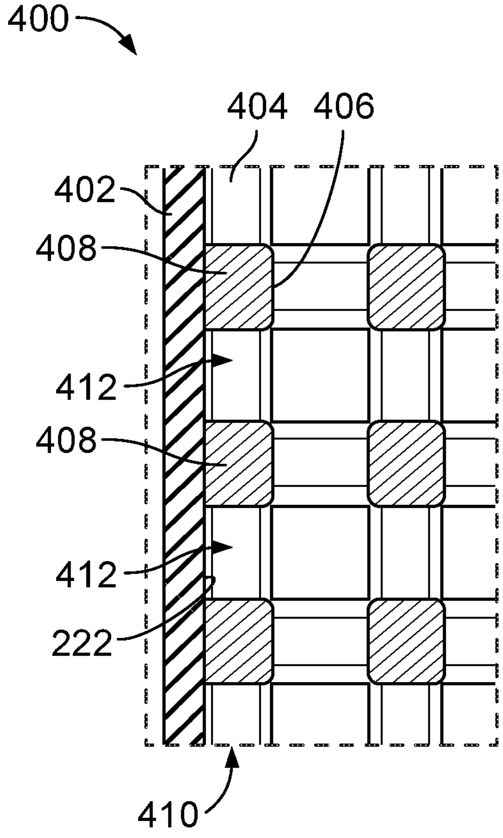
FIG. 4 is a cross-sectional view of the portion of the turbocharger device shown in FIG. 3, with the cross-section offset from the cross-section shown in FIG. 3.

FIG. 4 may be a cross-sectional view of the portion of the turbocharger 400 shown in FIG. 3, except the cross-section in FIG. 4 may be offset from the cross-section in FIG. 3. For example, FIG. 4 may be sectioned along a second plane that does not intersect the junctions 406. Rather, the second plane intersects the frame segments 408 elongated in a depth direction (out of the page). As shown in FIG. 4, the frame segments physically contact the second side 222 of the turbine back wall 402. The areas between the adjacent frame segments that engage the turbine back wall define the interstitial spaces 412. Like the internal pockets 226 (shown in FIG. 3), the interstitial spaces reduce the amount of solid matter of the bearing portion that engages the turbine back wall, thereby reducing thermal conduction from the turbine back wall into the bearing portion. For example, the areas of the turbine back wall that align with the interstitial spaces defined between the frame segments in the first plane 410 may be not in physical contact with the solid material of the lattice structure. Therefore, heat may be not able to be conducted into the bearing portion along those areas.

Although the turbine back wall may be shown as a discrete wall that may be separate from the lattice structure in FIGS. 3 and 4, it may be recognized that the turbine back wall may be integrally formed with, and seamlessly connected to, the lattice structure in another embodiment. For example, in an embodiment in which additive manufacturing forms both the turbine base wall and the lattice structure, layers that define the turbine back wall may be deposited and formed immediately before or after depositing and forming the layers that define the first plane of the lattice structure that interfaces with the turbine back wall. Even with the turbine back wall seamlessly connected to the lattice structure, the voids within the lattice structure, such as the interstitial spaces and the internal pockets, reduce thermal conduction from the hot exhaust gas within the turbine portion across the turbine back wall into the bearing portion.

Figure 5:
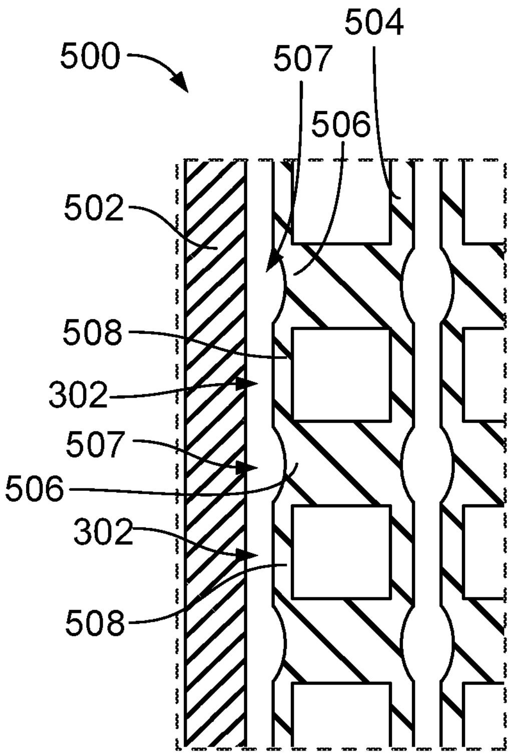
FIG. 5 is a cross-sectional view of a portion of the turbocharger device showing the turbine back wall and the lattice structure according to an alternative embodiment.
Figure 6:
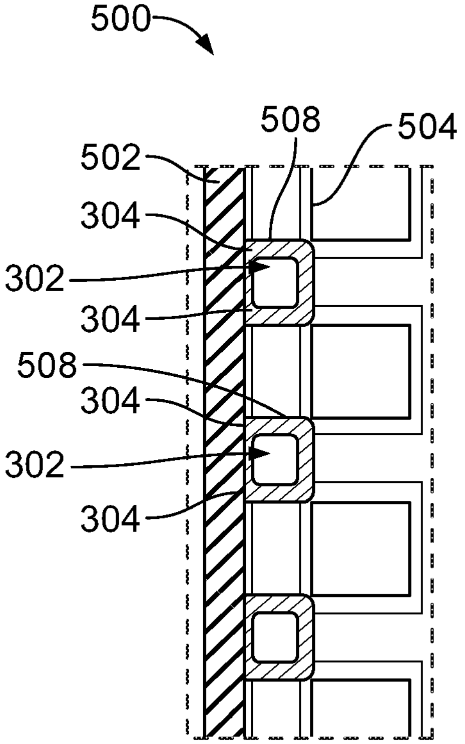
FIG. 6 is a cross-sectional view of the portion of the turbocharger device shown in FIG. 5, with the cross-section offset from the cross-section shown in FIG. 5.

FIG. 5 is a cross-sectional view of a portion of a turbocharger 500 showing a turbine back wall 502 and a lattice structure 504 according to an alternative embodiment. FIG. 6 is a cross-sectional view of the portion of the turbocharger 500 taken along a different plane than the cross-section shown in FIG. 5. For example, the cross-section in FIG. 5 may be taken along a first plane that extends through junctions 506, and the cross-section in FIG. 6 may be taken along a second plane offset from the first plane in a depth direction and extending through frame segments 508.

In FIG. 5, the junctions define internal pockets 507, and the frame segments are hollow. The frame segments define internal channels 302 therethrough. The internal channels may be fluidly connected to the internal pockets. The combination of the internal channels and the internal pockets may significantly limit the amount of mechanical surface-to-surface contact between the turbine back wall and the lattice structure, thereby significantly reducing thermal conduction paths into the bearing portion of the case. For example, there may be no mechanical surface-to-surface contact between the lattice structure and the turbine back wall along the first cross-sectional plane shown in FIG. 5. Along the second cross-sectional plane shown in FIG. 6, the only mechanical surface-to-surface contact may be along the annular thicknesses of the frame segments, which surround and define the internal channels. For example, each frame segment engages the turbine back wall along two contact areas 304. The two contact areas may be elongated along the depths of the frame segments (e.g., extending into the page).

In another alternative embodiment, the lattice structure may have hollow frame segments and solid junctions, such that the junctions lack internal pockets.

In an embodiment, a turbocharger device is provided that includes a case having a turbine portion and a bearing portion. The turbine portion defines a cavity that houses a turbine wheel. The cavity receives exhaust gas that rotates the turbine wheel. The bearing portion is connected to and extends from the turbine portion. The bearing portion houses a shaft connected to the turbine wheel. The bearing portion has a radial thickness between an exterior surface of the bearing portion and an interior surface of the bearing portion. The interior surface defines a central channel that is fluidly connected to the cavity of the turbine portion. The bearing portion holds a bearing system that supports the shaft within the central channel. The bearing portion includes a lattice structure within the radial thickness. The lattice structure is a repeating three-dimensional array of frame segments connected to one another at junctions. The lattice structure engages a turbine back wall that is located between the cavity of the turbine portion and the central channel of the bearing portion. The lattice structure defines interstitial spaces between the frame segments.

Optionally, the interstitial spaces of the lattice structure reduce thermal conduction from the exhaust gas within the turbine portion into the bearing portion.

Optionally, the junctions of the lattice structure define internal pockets therein. Optionally, the junctions of the lattice structure are arranged in multiple planes that are spaced apart along a longitudinal axis of the bearing portion. The junctions in a first plane of the planes engage the turbine back wall such that the internal pockets of the junctions in the first plane interface with the turbine back wall to limit a surface area of the lattice structure in contact with the turbine back wall.

Optionally, the lattice structure extends a radial width from an inner end that is proximate to the interior surface of the bearing portion to an outer end that is radially between the inner end and the exterior surface of the bearing portion. An outer diameter of the lattice structure defined by the outer end is equal to or greater than a diameter of the turbine wheel.

Optionally, the bearing portion of the case extends a length from the turbine portion to a compressor portion. The lattice structure extends, from the turbine back wall, a length that is at least one-fourth of the length of the bearing portion.

Optionally, the lattice structure includes repeating unit cells defined by the junctions and the frame segments. The unit cells have a parallelepiped shape.

Optionally, an outer perimeter of the lattice structure is fully enclosed within the radial thickness of the bearing portion, and the interstitial spaces between the frame segments of the lattice structure are filled with one or more gases.

Optionally, the bearing portion is seamlessly connected to the turbine portion such that the case defines a monolithic structure.

Optionally, the frame segments of the lattice structure are hollow.

Optionally, the lattice structure, relative to a solid material structure lacking the interstitial spaces, is configured to one or more of: (i) reduce thermal conduction from the exhaust gas within the turbine portion into the bearing portion, (ii) reduce vibration transmission between the turbine portion and the bearing portion, (iii) reduce the weight of the bearing portion, or (iv) define additional coolant pathways through the bearing portion.

In an embodiment, a turbocharger device is provided that includes a case having a radial thickness between an exterior surface of the case and an interior surface of the case. The interior surface defines a central channel. The case defines a bearing portion of the case. The bearing portion holds a bearing system that supports a shaft disposed within the central channel. The shaft is connected to a turbine wheel. The bearing portion of the case includes a lattice structure within the radial thickness of the case. The lattice structure is a repeating three-dimensional array of frame segments connected to one another at junctions. The lattice structure engages a turbine back wall that is located between the turbine wheel and the bearing portion of the case. The lattice structure defines interstitial spaces between the frame segments.

Optionally, an outer perimeter of the lattice structure is fully enclosed within the radial thickness of the case, and the interstitial spaces between the frame segments of the lattice structure are filled with one or more gases.

Optionally, the lattice structure includes repeating unit cells defined by the junctions and the frame segments. The unit cells have a parallelepiped shape.

Optionally, the junctions of the lattice structure define internal pockets therein.

Optionally, the case defines a turbine portion of the case adjacent to the bearing portion. The turbine portion houses the turbine wheel and receives exhaust gas that rotates the turbine wheel. The turbine portion is seamlessly connected to the bearing portion such that the case has a monolithic structure.

In an embodiment, a turbocharger device is provided that includes a case defining a bearing portion. The bearing portion has a radial thickness between an exterior surface of the bearing portion and an interior surface of the bearing portion. The interior surface defines a central channel. The bearing portion holds a bearing system that supports a shaft disposed within the central channel. The shaft is connected to a turbine wheel. The bearing portion includes a lattice structure within the radial thickness. The lattice structure is a repeating three-dimensional array of frame segments connected to one another at junctions of the lattice structure. The junctions define internal pockets therein. The junctions are arranged in multiple planes spaced apart along a length of the bearing portion. The lattice structure defines interstitial spaces between the frame segments. The junctions in a first plane engage a turbine back wall located between the turbine wheel and the central channel of the bearing portion. The internal pockets of the junctions in the first plane and the interstitial spaces between the frame segments connected to the junctions in the first plane interface with the turbine back wall to limit a surface area of the lattice structure in physical engagement with the turbine back wall.

Optionally, the case defines a turbine portion extending from the bearing portion. The turbine portion defines a cavity that houses the turbine wheel. The cavity receives exhaust gas that rotates the turbine wheel. The turbine portion is seamlessly connected to the bearing portion such that the case defines a monolithic structure.

Optionally, an outer perimeter of the lattice structure is fully enclosed within the radial thickness of the bearing portion. The outer perimeter of the lattice structure has an equal or greater diameter than a diameter of the turbine wheel.

Optionally, the frame segments of the lattice structure are hollow to define channels therein. The channels of the frame segments coplanar with the first plane interface with the turbine back wall to limit a surface area of the lattice structure in contact with the turbine back wall.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are within the scope of the claims if they have structural elements that do not differ from the literal language of the claims, or if they include equivalent structural elements with insubstantial differences from the literal languages of the claims.

The foregoing description of certain embodiments of the inventive subject matter will be understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A turbocharger device comprising:

a case including a turbine portion and a bearing portion, the turbine portion defining a cavity configured to house a turbine wheel and to receive exhaust gas that rotates the turbine wheel, wherein the bearing portion is connected to and extends from the turbine portion, the bearing portion configured to house a shaft connected to the turbine wheel, the bearing portion having a radial thickness between an exterior surface of the bearing portion and an interior surface of the bearing portion, the interior surface defining a central channel that is fluidly connected to the cavity of the turbine portion, the bearing portion configured to hold a bearing system that supports the shaft within the central channel, and wherein the bearing portion includes a lattice structure seamlessly integrated within the radial thickness of the bearing portion, the lattice structure comprising a repeating three-dimensional array of frame segments connected to one another at junctions and defining interstitial spaces between the frame segments.

2. The turbocharger device of claim 1, wherein the junctions of the lattice structure define internal pockets therein.

3. The turbocharger device of claim 2, wherein the junctions of the lattice structure are arranged in multiple planes that are spaced apart along a longitudinal axis of the bearing portion, and the junctions in a first plane of the planes engage a turbine back wall such that the internal pockets of the junctions in the first plane interface with the turbine back wall to limit a surface area of the lattice structure in contact with the turbine back wall.

4. The turbocharger device of claim 1, wherein the lattice structure extends a radial width from an inner end that is proximate to the interior surface of the bearing portion to an outer end that is radially between the inner end and the exterior surface of the bearing portion, wherein an outer diameter of the lattice structure defined by the outer end is equal to or greater than a diameter of the turbine wheel.

5. The turbocharger device of claim 1, wherein the bearing portion of the case extends a length from the turbine portion to a compressor portion, the lattice structure extending from a turbine back wall, at an end of the bearing portion, for a length that is at least one-fourth of the length of the bearing portion.

6. The turbocharger device of claim 1, wherein the lattice structure includes repeating unit cells defined by the junctions and the frame segments, the unit cells having a parallelepiped shape.

7. The turbocharger device of claim 1, wherein an outer perimeter of the lattice structure is fully enclosed within the radial thickness of the bearing portion, and the interstitial spaces between the frame segments of the lattice structure are filled with one or more gases.

8. The turbocharger device of claim 1, wherein the bearing portion is seamlessly connected to the turbine portion such that the case defines a monolithic structure.

9. The turbocharger device of claim 1, wherein the frame segments of the lattice structure are hollow.

10. The turbocharger device of claim 1, wherein the lattice structure is fully enclosed within the radial thickness of the bearing portion such that the lattice structure has a closed perimeter defined by the bearing portion.

11. The turbocharger device of claim 1, further comprising a turbine back wall at an interface between the bearing portion and the turbine portion, wherein the lattice structure is seamlessly connected to the turbine back wall.

12. A turbocharger device comprising:

a case having a radial thickness between an exterior surface of the case and an interior surface of the case, the interior surface defining a central channel, the case comprising a bearing portion of the case configured to hold a bearing system configured to support a shaft within the central channel connected to a turbine wheel, wherein the bearing portion includes a lattice structure within the radial thickness of the case, the lattice structure comprising a repeating three-dimensional array of frame segments connected to one another at junctions, the lattice structure seamlessly connected to a turbine back wall located at an end of the bearing portion, the lattice structure defining interstitial spaces between the frame segments.

13. The turbocharger device of claim 12, wherein an outer perimeter of the lattice structure is fully enclosed within the radial thickness of the case, and the interstitial spaces between the frame segments of the lattice structure are filled with one or more gases.

14. The turbocharger device of claim 12, wherein the lattice structure includes repeating unit cells defined by the junctions and the frame segments, the unit cells having a parallelepiped shape.

15. The turbocharger device of claim 12, wherein the junctions of the lattice structure define internal pockets therein.

16. The turbocharger device of claim 12, wherein the case comprises a turbine portion of the case adjacent to the bearing portion, the turbine portion configured to house the turbine wheel and receive exhaust gas that rotates the turbine wheel, wherein the turbine portion is seamlessly connected to the bearing portion such that the case has a monolithic structure.

17. A turbocharger device comprising:

a case comprising a bearing portion that has a radial thickness between an exterior surface of the bearing portion and an interior surface of the bearing portion, the interior surface defining a central channel, the bearing portion configured to hold a bearing system configured to support a shaft within the central channel connected to a turbine wheel, wherein the bearing portion includes a lattice structure within the radial thickness, the lattice structure comprising a repeating three-dimensional array of frame segments connected to one another at junctions of the lattice structure, the junctions defining internal pockets therein, the junctions being arranged in multiple planes spaced apart along a length of the bearing portion, the lattice structure defining interstitial spaces between the frame segments, the junctions in a first plane of the planes engaging a turbine back wall located at an end of the bearing portion, wherein the internal pockets of the junctions in the first plane and the interstitial spaces between the frame segments connected to the junctions in the first plane limit a surface area of the lattice structure in physical engagement with the turbine back wall.

18. The turbocharger device of claim 17, wherein the case comprises a turbine portion extending from the bearing portion, the turbine portion defining a cavity configured to house the turbine wheel and receive exhaust gas that rotates the turbine wheel, wherein the turbine portion is seamlessly connected to the bearing portion such that the case defines a monolithic structure.

19. The turbocharger device of claim 17, wherein an outer perimeter of the lattice structure is fully enclosed within the radial thickness of the bearing portion, the outer perimeter of the lattice structure having an equal or greater diameter than a diameter of the turbine wheel.

20. The turbocharger device of claim 17, wherein the frame segments of the lattice structure are hollow to define channels therein, wherein the frame segments that are coplanar with the first plane engage the turbine back wall and the channels of the frame segments that are coplanar with the first plane are open to the turbine back wall to limit a surface area of the lattice structure in contact with the turbine back wall.

* * * * *